DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 1, 1974

927 O.G. 10

T927,011
HOT MELT ADHESIVE FOR SEALING METAL CONTAINERS

Irving P. Esbitt, Wilmington, Del., assignor to E. I. du Pont de Nemours and Company, Wilmington, Del.

Continuation of application Ser. No. 318,503, Dec. 26, 1972, which is a continuation-in-part of application Ser. No. 297,038, Oct. 13, 1972, both now abandoned. This application Dec. 27, 1973, Ser. No. 428,810
Int. Cl. B65d *17/20;* C08f *45/52*
U.S. Cl. 220—53
1 Sheet Drawing. 17 Pages Specification

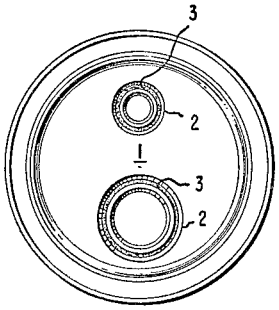

A hot melt adhesive that is useful for sealing containers, in particular the scribed portion of the lid of a beverage container that allows for easy opening of the container, is the subject of this invention; the hot melt adhesive is a blend of:

(A) 5–40% by weight of an ethylene/vinyl acetate copolymer;
(B) 5–40% by weight of a tackifier resin of a thermoplastic mixed polyolefin resin;
(C) 30–70% by weight of a microcrystalline hydrocarbon wax;
(D) 2–30% by weight of a polystyrene resin having a molecular weight of about 250–4000; and the hot melt adhesive has a specified tensile strength and percent elongation at break to allow for easy opening of the container but has sufficient strength to permanently seal the lid onto the container.

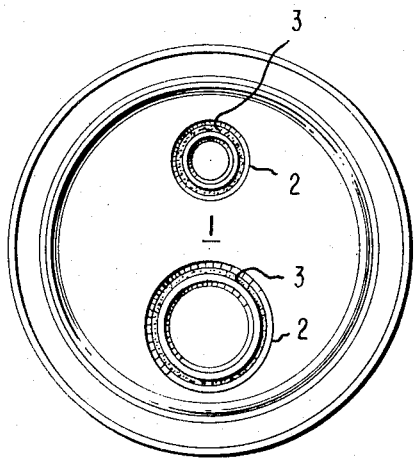

Oct. 1, 1974 I. P. ESBITT T927,011
HOT MELT ADHESIVE FOR SEALING METAL CONTAINERS
Original Filed Dec. 26, 1972